May 17, 1960     C. K. STILLWAGON     2,936,778
BUTTERFLY VALVE
Filed May 19, 1955     2 Sheets-Sheet 1
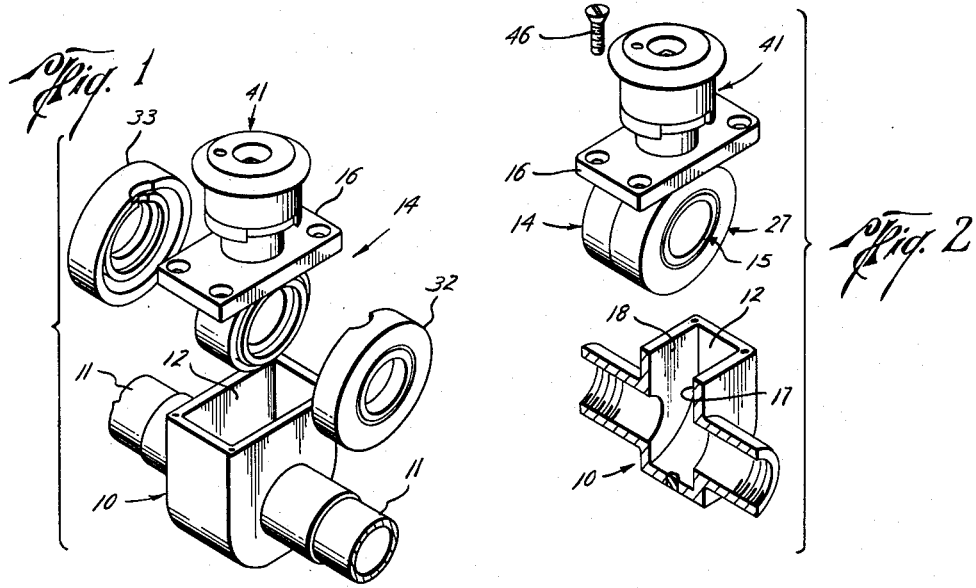
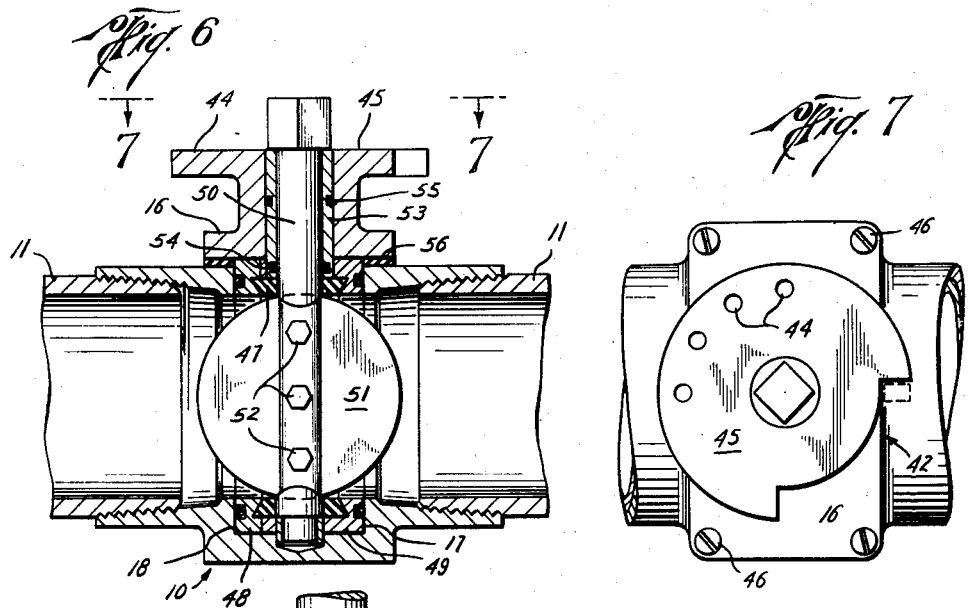
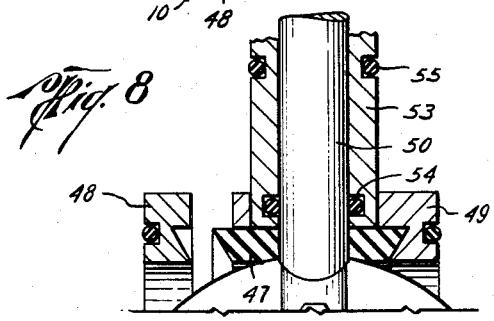
Crawford K. Stillwagon
INVENTOR.
BY Browning, Simms & Hyer
ATTORNEYS

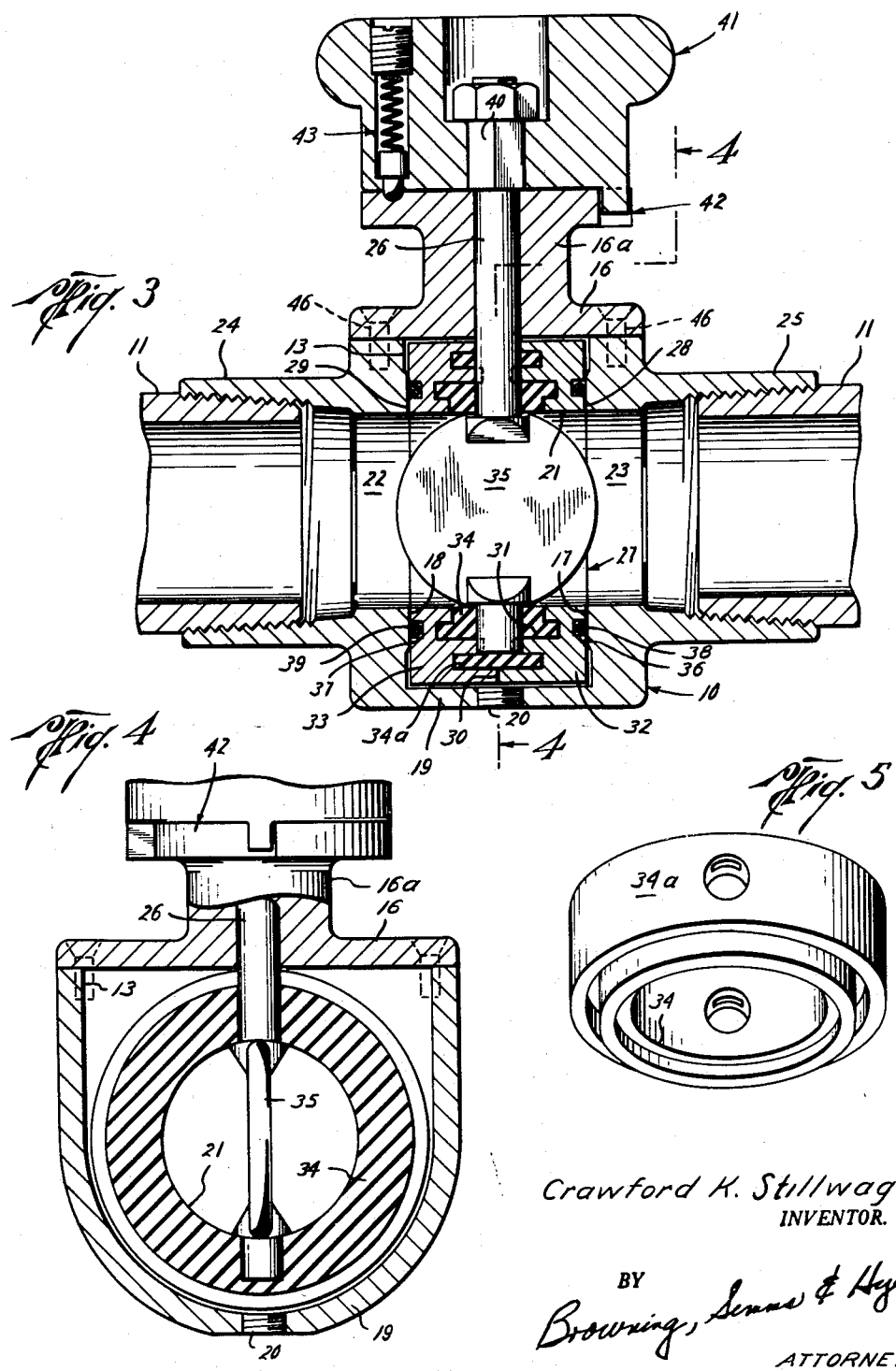

United States Patent Office 2,936,778
Patented May 17, 1960

2,936,778

BUTTERFLY VALVE

Crawford K. Stillwagon, Houston, Tex.

Application May 19, 1955, Serial No. 509,502

7 Claims. (Cl. 137—454.6)

This invention relates to a valve assembly and, more particularly, to a valve assembly adapted to be made up in a flow line and having a valve which is quickly and easily removable from the assembly for cleaning, repairing or the like.

In many industries such as the food handling industry the flow lines carrying various fluids must be periodically cleaned. Down time of these flow lines desirably is held to a minimum. One of the most time-consuming operations in cleaning such a flow line is the cleaning of valves controlling flow through such line. Desirably, the valves are removed from the line, disassembled, thoroughly cleaned, reassembled, and again made up in the line. Various types of valves have been proposed for this service. Examples of such valves may be found in my copending applications Serial No. 276,775, filed March 15, 1952, now Patent No. 2,740,423, issued April 3, 1956, and Serial No. 487,588, filed February 11, 1955. While the prior art valves have been successfully used by the industry for many years, considerable time is required to remove the valves from the line, disassemble, clean and reinsert them in the line and it is the general object of this invention to provide a valve assembly in which the valve may be removed, cleaned and reinstalled in the line in less time than valves presently available for this service.

Another object of this invention is to provide a valve assembly in which a fitting is permanently made up in a flow line and a valve is laterally inserted into the fitting without disturbing the fitting and when so inserted all seals are automatically perfected and the valve becomes a part of the flow line.

Another object is to provide a valve assembly employing a valve of the type shown in my copending application Serial No. 487,588, and having two flange faces in which the necessity for removing a ring of bolts to permit release of the valve is eliminated.

Another object is to provide a valve assembly in which a valve which forms a part of the flow line may be moved laterally into and out of the fitting without disturbing the fitting other than removing a retainer blocking lateral movement of the valve.

Another object is to provide a valve assembly which includes a flow fitting having a cavity therein and a valve insertable through a side door into said cavity in which seals between the cavity and valve body are perfected upon insertion of the valve and the valve becomes a part of the flow line, and in which the valve is held in position within the cavity by a quick release means permitting the valve to be quickly inserted or removed from the cavity of the fitting.

Another object is to provide a valve assembly having a fitting permanently made up in a flow line and a valve which is laterally insertable and removable from said fitting without disturbing the fitting and in which the parts of the valve exposed to fluid within the flow line during use are held in assembled relationship by the fitting when the valve is inserted into the fitting.

Another object is to provide a valve assembly having a fitting adapted to be permanently made up in a line and a valve insertable and removable from the fitting without disturbing the fitting in which all of the parts exposed to flow through the valve are provided with interlocking surfaces which hold these several elements of the valve in proper relationship to each other and in which these several parts are held against disassembly by the valve being inserted in the fitting so that when the valve is removed from the line for cleaning or repair its parts may be disassembled by disengaging the interlocking surfaces.

Other objects, features and advantages of this invention will be apparent to one skilled in the art from a consideration of the drawings, the specification and the appended claims.

In the drawings where there is shown by way of illustration two embodiments of this invention and wherein like reference numerals indicate like parts:

Fig. 1 is an exploded isometric view of one form of this invention illustrating the facility with which the valve may be withdrawn through the side door of a line fitting and the interlocking parts of the valve disengaged to permit dismantling of the valve for cleaning and repair;

Fig. 2 is a like exploded isometric view showing the valve assembly of Fig. 1 with the flow line fitting shown in section to better illustrate its details of construction and with the several portions of the valve per se held in assembled relationship by their interlocking parts with the valve ready for reinsertion into the flow line fitting;

Fig. 3 is a view in vertical cross section through the valve assembly of Figs. 1 and 2 on an enlarged scale further illustrating the interlocking surfaces and seal means between the portions of the valve which are exposed to flow through the line;

Fig. 4 is a view along the lines 4—4 of Fig. 3 in the direction of the arrows;

Fig. 5 is an isometric view of the seal employed in the Fig. 3 form of the invention;

Fig. 6 is a view in vertical cross section through a modified form of valve assembly embodying this invention;

Fig. 7 is a plan view along the lines 7—7 of Fig. 6; and

Fig. 8 is a view of a fragment of the valve of Fig. 6 on an enlarged scale.

Referring now to Figs. 1 and 2, the valve assembly of this invention includes a fitting indicated generally at 10 adapted to be made up in flow line 11. The body of the fitting has a cavity 12 therein and a lateral side door opening 13 through which a valve indicated generally at 14 may be inserted and removed. When in position in cavity 12, valve 14 and fitting 10 have a passageway therethrough providing for the passage of fluid within flow line 11. Suitable pressure energized seal means 15 surround the inlet and outlet of valve 14 and prevent loss of fluid between the cavity wall and valve. The valve is held in position within fitting 10 by a retainer means such as cover plate 16 which closes side door 13. It will be observed from Figs. 1 and 2 that the valve may be easily inserted and removed through side door 13 for cleaning and repair when necessary. As illustrated in Fig. 1, the valve may be separated into several parts upon being removed from the fitting for cleaning, etc.

Fitting 10 comprises in its essential elements confronting surfaces 17 and 18 adapted to receive valve 14 therebetween and a means for rigidly maintaining these confronting surfaces in spaced relationship such as the web of material 19 extending circumferentially about the fitting and joining these two confronting surfaces together. It will be understood that while web 19 is imperforate with the exception of side door opening 13 and a clean-out plug 20 in the bottom that it is not necessarily so as the fluid passing through the valve is entirely contained within the valve 14 by the valve body which extends circumferentially entirely about the passageway 21 through the valve and confines flow through the valve to said passageway 21. For ease of manufacture and assembly, the confronting surfaces 17 and 18 are plane surfaces and are parallel with each other. Where the solid web of material 19 between the confronting faces 17 and 18 is employed, there results what might be termed a cavity within the fitting to which access is provided by side door 13. The side door is at least as large as the portion of valve 14 to be inserted into the cavity to permit free passage of the valve into the cavity. Preferably, the side door is slightly larger than the space between the two ends of web 19 at the side door as shown in Fig. 4 and between confronting surfaces 17 and 18 as indicated in Fig. 3 to permit free passage of the valve through the side door. An inlet and an outlet to this cavity 12 is provided by openings 22 and 23 on opposite sides of the cavity. In the embodiment shown this inlet and outlet open into the confronting walls 17 and 18. Opening 22 extends to the exterior of fitting 10 and terminates in an end fitting 24 which is adapted to be made up in a flow line 11 as indicated. Likewise opening 23 extends to the exterior of the fitting and terminates in an end fitting 25 adapted to be made up in flow line 11. It will be understood that one of these openings provides an inlet for the fitting and the other provides an outlet for the fitting depending upon the direction of flow through the line 11 and that these openings together with passageway 21 through valve 14 form a passageway through the fitting.

As hereinbefore indicated, side door 13 is closed by a cover plate 16. While the cover plate encloses the cavity, it is not necessarily pressure retaining as its principal function is to position and retain the valve 14 within fitting 10. It also functions to exclude dust from the cavity. If desired, a gasket may be interposed between the body of fitting 10 and cover plate 16 and a seal provided about valve stem 26 as in the Fig. 6 embodiment of this invention and in such case the cover plate 16 would function as an auxiliary seal element in the event of failure of one of the primary seal elements of the valve 14.

The valve 14 is designed to move laterally into and out of the fitting through side door 13 and is dimensioned to fit in cavity 12. The valve has a body portion indicated generally at 27 which is provided with opposed surfaces 28 and 29 which confront respectively fitting body surfaces 17 and 18 and are of like configuration therewith, that is, plane parallel surfaces, to permit the valve body to be inserted and withdrawn laterally of the fitting through side door 13. The valve dimension between opposed surfaces 28 and 29 is such that the valve is close fitting within the space between surfaces 17 and 18 so that the seals of the assembly will be backed up and not tend to flow into cracks under pressure.

In order that the several parts of the valve which are exposed to fluid passing through passageway 21 be readily disassembled for cleaning and repair, the body 27 is split at 30 in a plane which passes through an internal seat receiving groove 31 to form two retainers 32 and 33. The groove 31 surrounds and opens into passageway 21 and is formed with undercut surfaces as shown which interlock with like formed surfaces on a resilient seat 34 in the groove to hold the several parts of the valve in assembled relationship without the need of screws or the like when the valve is positioned within cavity 12. A disc-type valve element 35 cooperates with seat 34 to control flow through the valve.

Preferably, the dimensioning of the groove 31 and resilient seat 34 is such that when the valve body is inserted into fitting 10 the seat will be slightly compressed to insure a seal between the seat and retainers as the seat 34 functions both as a seat and a seal between the split retainers.

Seat 34 is provided with a combination anchor and auxiliary seal 34a as will more clearly appear in my copending application Serial No. 487,588 to which reference is expressly made for a more detailed discussion of this valve. This anchor is especially useful in maintaining the seat in position when the valve is used on suction service and this form of valve is preferred for suction service.

A pressure energized seal is provided between the valve and cavity wall and surrounds the flow passageway through the valve so that the valve forms an integral part of the flow passageway through the fitting. As this passageway extends through surfaces 17, 18, 28 and 29, the seal is provided between each of the confronting faces of the fitting and valve, that is, between confronting surfaces 18 and 29 and between confronting surfaces 17 and 28. Preferably, this pressure energized seal is provided by forming in the valve body a pair of annular grooves 36 and 37 which open into surfaces 28 and 29 of the valve body and surround the termini or inlet and outlet of passageway 21 in surfaces 28 and 29. Annular O-rings 38 and 39 are positioned within these grooves and engage the confronting surfaces 17 and 18, respectively, of the fitting body to provide a pressure energized seal between the valve and body.

From the above it will be seen that the valve body in addition to extending circumferentially completely about the passageway through the valve also extends between the confronting walls 17 and 18 of the fitting 10 and confine flow therebetween. Thus, the valve in effect becomes a part of flow line 11.

The butterfly disc 35 is made integral with valve stem 26 which projects through a neck portion 16a on cover plate 16 and terminates in a square shank or wrench part 40 to which there is secured a valve actuator handle or knob indicated generally at 41. A lug stop arrangement indicated generally at 42 permits rotation of the valve through 90 degrees between full open and full closed position. A spring-loaded ball catch indicated generally at 43 cooperates with spaced indentions 44 in the upper face 45 of cover plate 16 to provide a detent for positioning the valve disc 35 at points intermediate its opened and closed positions.

Four fast lead screws 46 secure the cover plate to fitting 10 and when these screws are removed the valve may be withdrawn from cavity 12. As soon as the valve body 27 clears side door 13, the split retainers may be moved endwise of the valve seat and apart from each other leaving the valve member 35 and seat 34 exposed for cleaning. The split retainers 32 and 33 may be cleaned and also O-rings 38 and 39 cleaned by merely removing the O-rings from their grooves. As fluid is not free to move radially outwardly beyond the O-rings and seat, there is no necessity for cleaning between valve stem 26 and the cover plate 16. The several parts of the valve are then reassembled by moving the retainers endwise into position about the seat, placing the O-rings in their grooves and reinserting the valve within fitting 10. The valve is held in position solely by the cover plate 16 and screws 46. It will be noticed that the valve is a balanced valve, that is, the area of the valve exposed to pressure is equal in all directions about the axis of passageway 21 and hence the force exerted on the valve by fluid in the passageway will be equal in a radial direction and there will be no tendency for fluid to tend to move the valve out of its cavity.

The resilient seat 34 will usually be of a flowable material which will tend to spread the retainer rings apart under pressure. Thus, the opposing faces of the valve body will be held in firm engagement with the confronting faces of the fitting while the flow line is under pressure.

Referring now to Figs. 6, 7 and 8, there is shown another form of valve for use with fitting 10. The fitting is substantially identical with the fitting shown in the other figures. The essential difference in the valve is that the anchor 34a of the valve seat has been omitted and the seat provided by an annular resilient member 47 which in cross section has a dove-tailed shape as shown in Figs. 6 and 8. The body is again split into retainers 48 and 49 to permit endwise movement of the two-piece body relative to the seat 47 for ease of assembly and disassembly. In this form of valve the split is not coincident with the bore for the stem 50 of the valve member and the stem must be removed before the retainer member 49 can be moved endwise relative to seat 47. To permit this the valve disc and stem are made in two pieces with the disc 51 secured to stem 50 by a plurality of studs 52. In this form of valve, the valve stem 50 is surrounded by a bushing 53 and an O-ring seal 54 is provided between the bushing and the valve stem. An O-ring seal 55 is also provided between the bushing and the bore through cover plate 16 but this O-ring as well as the gasket 56 between the cover plate 16 and fitting 10 are optional as they function to provide an auxiliary seal.

When it is desired to clean the valve of Fig. 6, the screws 46 are again removed and the entire valve withdrawn from the cavity of fitting 10. The retainer 48 is moved endwise of seat 47 and away from the seat and laid aside. Studs 52 are removed and valve disc 51 removed from stem 50. The stem 50 may then be withdrawn and the other half of the body, that is, the retainer ring 49, may be moved endwise away from the seat 47 for cleaning. The reverse order is followed in assembling this form of valve and after assembling the valve may be inserted through the side door 13 and into position within cavity 12.

From the above it will be seen that all of the objects of this invention have been attained. There has been provided a valve assembly having a fitting 10 which may be permanently made up in a flow line and a valve 14 which may be moved laterally of the fitting into and out of a cavity 12 within the fitting where it provides a part of the flow passageway through the fitting. All seals necessary to permit valve 14 to function as a part of the passageway are automatically perfected when the valve is inserted. The usual time-consuming bolting together of flanges and valve body, etc., has been eliminated and it is only necessary to screw down a cover plate which functions as a retainer to hold the valve in position within the fitting body. When the valve is removed from the fitting cavity, the portions of the valve which are exposed to fluid passing through the valve are readily and easily disassembled for cleaning. They may be easily reassembled and the valve moved back into position within fitting 10. In one form of the invention shown in the application all of the parts are held together by abutment between surfaces and interlocking faces with the exception of the four holddown screws 46. In the other form of the invention this same association is true except that it is necessary to remove three studs to remove the valve disc from the valve stem before the valve may be completely disassembled.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve assembly comprising, a fitting adapted to be made up in a flow line and having confronting surfaces adapted to receive a valve therebetween, means for holding said confronting surfaces in rigid spaced apart relationship, a valve positioned between said surfaces and having a body with surfaces which confront and are of like configuration with the fitting surfaces to permit the valve to be moved laterally of the fitting into and out of position between the fitting surfaces, a flow passageway through the valve body and fitting, said passageway extending through each of said surfaces, an annular seat receiving groove in the valve body opening into the surrounding the passageway, an annular resilient seat in said groove and a valve member cooperative with the seat to control flow through the passageway, said body split into two parts in a plane lying in the groove to permit the parts of the valve body to be moved endwise of the seat into and out of assembled relationship about the seat, and pressure actuated seal means between said confronting valve body surfaces and fitting surfaces and surrounding the passageway to seal between the valve and fitting, said valve body extending circumferentially completely about the passageway through the valve and extending between the confronting fitting surfaces to confine flow therebetween, whereby the fitting may be made up in a flow line and the valve inserted between confronting surfaces of the fitting so that the valve body itself can confine flow between such surfaces and the valve can be removed for cleaning and repair without movement apart of the confronting surfaces of the fitting.

2. A valve assembly comprising, a fitting adapted to be made up in a flow line and having confronting surfaces adapted to receive a valve therebetween, means for holding said confronting surfaces in rigid spaced apart relationship, a valve positioned between said surfaces and having a body with surfaces which confront and are of like configuration with the fitting surfaces to permit the valve to be moved laterally of the fitting into and out of position between the fitting surfaces, a flow passageway through the valve body and fitting, said passageway extending through each of said surfaces, an annular seat receiving groove in the valve body opening into and surrounding the passageway, an annular resilient seat in said groove and a valve member cooperative with the seat to control flow through the passageway, said body split into two parts in a plane lying in the groove to permit the parts of the valve body to be moved endwise of the seat into and out of assembled relationship about the seat, said two parts of the body being held in assembled relationship about the seat by the confronting surfaces of the fitting and the seat providing a seal between the two parts of the body to prevent leakage therebetween, whereby the valve may be readily disassembled for cleaning and repair when removed from the fitting, and pressure actuated seal means between said confronting valve body surfaces and fitting surfaces and surrounding the passageway to seal between the valve and fitting, said valve body extending circumferentially completely about the passageway through the valve and extending between the confronting fitting surfaces to confine flow therebetween, whereby the fitting may be made up in a flow line and the valve inserted between confronting surfaces of the fitting so that the valve body itself can confine flow between such surfaces and the valve can be removed for cleaning and repair without movement apart of the confronting surfaces of the fitting.

3. A valve assembly comprising, a fitting adapted to be made up in a flow line and having a body with a cavity therein, said cavity having at least two opposite wall sections, a side door in the body providing access to the cavity, a valve extending between opposite wall sections of the cavity and insertable and removable through the side door, a flow passageway through the fitting body and valve and extending from the cavity to the exterior of the fitting body at two points to provide an inlet and outlet for the fitting, pressure actuated seal means between the valve and the wall of said cavity and surrounding the inlet and outlet from the cavity to seal between the valve and said body, said valve having a body extending circumferentially completely about the passageway through the valve and extending from the inlet to the outlet of the cavity to confine flow therebetween, an annular seat receiving groove in the valve body opening into and surrounding the passageway, and an annular resilient seat in said groove and a valve member cooperative with the seat to control flow through the passageway, said body split into two parts in a plane lying in the groove to permit the parts of the valve body to be moved endwise of the seat into and out of assembled relationship about the seat, whereby the fitting may be made up in a flow line and the valve inserted in the cavity so that the valve body itself can confine flow between the inlet and outlet to the cavity and the valve can be readily removed through the side door and disassembled for cleaning and repair.

4. A valve assembly comprising, a fitting adapted to be made up in a flow line and having a body with a cavity therein, said cavity having at least two opposite wall sections, a side door in the body providing access to the cavity, a valve extending between opposite wall sections of the cavity and insertable and removable through the side door, a flow passageway through the fitting body and valve and extending from the cavity to the exterior of the fitting body at two points to provide an inlet and oulet for the fitting, pressure actuated seal means between the valve and the wall of said cavity and surrounding the inlet and outlet from the cavity to seal between the valve and said body, said valve having a body extending circumferentially completely about the passageway through the valve and extending from the inlet to the outlet of the cavity to confine flow therebetween, an annular seat receiving groove in the valve body opening into and surrounding the passageway, and an annular resilient seat in said groove and a valve member cooperative with the seat to control flow through the passageway, said body split into two parts in a plane lying in the groove to permit the parts of the valve body to be moved endwise of the seat into and out of assembled relationship about the seat, said two parts of the body being held in assembled relationship about the seat by the confronting surfaces of the fitting and the seat providing a seal between the two parts of the body to prevent leakage therebetween, whereby the fitting may be made up in a flow line and the valve inserted in the cavity so that the valve body itself can confine flow between the inlet and outlet to the cavity and the valve can be readily removed through the side door and disassembled for cleaning and repair.

5. A valve assembly comprising, a fitting adapted to be made up in a flow line and having confronting surfaces adapted to receive a valve therebetween, means for holding said confronting surfaces in rigid spaced apart relationship, a valve positioned between said surfaces and having a body with surfaces which confront and are of like configuration with the fitting surfaces to permit the valve to be moved laterally of the fitting into and out of position between the fitting surfaces, a flow passageway through the valve body and fitting, said passageway extending through each of said surfaces, an annular seat receiving groove in the valve body opening into and surrounding the passageway, an annular resilient seat in said groove and a valve member cooperative with the seat to control flow through the passageway, said body split into two parts in a plane lying in the groove to permit the parts of the valve body to be moved endwise of the seat into and out of assembled relationship about the seat, and a pressure actuated seal means between said confronting valve body surfaces and fitting surfaces and surrounding the passageway to seal between the valve and the fitting.

6. A valve assembly comprising, a fitting adapted to be made up in a flow line and having confronting surfaces adapted to receive a valve therebetween, means for holding said confronting surfaces in rigid spaced apart relationship, a valve positioned between said surfaces and having a body with surfaces which confront and are of like configuration with the fitting surfaces to permit the valve to be moved laterally of the fitting into and out of position between the fitting surfaces, a flow passageway through the valve body and fitting, said passageway extending through each of said surfaces, an annular seat receiving groove in the valve body opening into and surrounding the passageway, an annular resilient seat in said groove and a valve member cooperative with the seat to control flow through the passageway, said body being in two parts joined together along a parting surface which intersects the groove to permit the parts of the valve body to be moved endwise of the seat into and out of assembled relationship about the seat, said two parts of the body being held in assembled relationship about the seat by the confronting surfaces of the fitting and the seat providing a seal between the two parts of the body to prevent leakage therebetween, whereby the valve may be readily disassembled for cleaning and repair when removed from the fitting, and pressure actuated seal means between said confronting valve body surfaces and fitting surfaces and surrounding the passageway to seal between the valve and fitting.

7. A valve assembly as set forth in claim 6 in which the effective internal areas of said body and seat exposed to internal pressure tending to move the valve body in two opposite directions laterally of the flow passageway are equal.

References Cited in the file of this patent

UNITED STATES PATENTS

| | | |
|---|---|---|
| 2,547,831 | Mueller | Apr. 3, 1951 |
| 2,621,888 | Allen | Dec. 16, 1952 |

FOREIGN PATENTS

| | | |
|---|---|---|
| 2,354 | Great Britain | June 6, 1876 |
| 493 | Great Britain | Jan. 10, 1891 |
| 142,057 | Austria | of 1935 |
| 670,327 | Germany | of 1939 |